(12) United States Patent
Kumar et al.

(10) Patent No.: US 10,827,400 B2
(45) Date of Patent: Nov. 3, 2020

(54) ALLOCATING RADIO RESOURCES IN A CELLULAR NETWORK

(71) Applicant: Telefonaktiebolaget LM Ericsson (publ), Stockholm (SE)

(72) Inventors: N. Hari Kumar, Tamil Nadu (IN); Ruvaitha Banu, Tamil Nadu (IN); Karthikeyan Premkumar, Tamil Nadu (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 15/768,679

(22) PCT Filed: Dec. 15, 2015

(86) PCT No.: PCT/IN2015/050202
§ 371 (c)(1),
(2) Date: Apr. 16, 2018

(87) PCT Pub. No.: WO2017/068594
PCT Pub. Date: Apr. 27, 2017

(65) Prior Publication Data
US 2018/0317142 A1   Nov. 1, 2018

(30) Foreign Application Priority Data

Oct. 19, 2015 (IN) .......................... 3370/DEL/2015

(51) Int. Cl.
*H04Q 3/10*  (2006.01)
*H04W 72/00* (2009.01)
(Continued)

(52) U.S. Cl.
CPC ....... *H04W 36/0072* (2013.01); *H04W 24/10* (2013.01); *H04W 36/0083* (2013.01); *H04W 72/0486* (2013.01); *H04W 72/048* (2013.01)

(58) Field of Classification Search
CPC ............. H04W 36/0072; H04W 24/10; H04W 36/0083; H04W 72/0486; H04W 72/048;
(Continued)

(56) References Cited

U.S. PATENT DOCUMENTS 9,686,701 B2 *   6/2017  Sayeed ................. H04W 24/08
2002/0181419 A1 * 12/2002  Zhang ...................... H04L 29/06
370/331
(Continued)

FOREIGN PATENT DOCUMENTS

EP        2 353 337 A1      8/2011
WO   WO 2008/031258 A1    3/2008
(Continued)

OTHER PUBLICATIONS

International Search Report and Written Opinion of the International Searching Authority for International Application No. PCT/IN2015/050202 dated May 18, 2016, 10 pages.
(Continued)

*Primary Examiner* — Edan Orgad
*Assistant Examiner* — Vanneilian Lalchinthang
(74) *Attorney, Agent, or Firm* — Sage Patent Group

(57) ABSTRACT

A method of allocating radio resources in a cellular network by a network node associated with a destination cell. Prior to a handover of a moving user equipment (UE) from an originating cell to the destination cell, receiving a moving user resource requirement and a predicted handover time for the moving UE, estimating a total resource requirement comprising a sum of the moving user resource requirement and an initial resource requirement comprising a sum of resource requirements of other UEs in the destination cell, determining whether a capacity of the destination cell is sufficient to provide for the total resource requirement. If the capacity is not sufficient, a decrement factor is determined for each UE in the destination cell by determining a required resource reduction using a difference between the capacity and the total resource requirement, determining a reduction factor for each UE in the destination cell by allocating a portion of the required resource reduction to each UE, determining a number of rescheduling events that will occur before the handover time and calculating the decrement (Continued)

factor for each existing UE by dividing the reduction factor by the number of rescheduling events and at each rescheduling event, and decrementing the resources available to each user equipment by the respective decrement factor. On handover, the moving UE is provided with an allocated radio resource equal to at least part of the moving user resource requirement.

17 Claims, 13 Drawing Sheets

(51) Int. Cl.
*H04W 36/00* (2009.01)
*H04W 72/04* (2009.01)
*H04W 24/10* (2009.01)

(58) Field of Classification Search
CPC ..... H04W 36/08; H04W 92/12; H04W 28/08; H04L 41/0896; H04L 43/0876
USPC ........................................................ 370/331
See application file for complete search history.

(56) References Cited

U.S. PATENT DOCUMENTS

| | | | |
|---|---|---|---|
| 2009/0316651 A1* | 12/2009 | Lee ................... | H04W 72/0486 370/331 |
| 2010/0124933 A1* | 5/2010 | Chowdhury ........ | H04L 41/0896 455/453 |
| 2013/0286879 A1* | 10/2013 | ElArabawy ...... | H04N 21/26208 370/252 |
| 2014/0036665 A1* | 2/2014 | Chowdhury ........ | H04L 41/0896 370/230 |
| 2014/0148174 A1* | 5/2014 | Teyeb ............... | H04W 36/0083 455/441 |
| 2014/0321425 A1* | 10/2014 | Mueck .................. | H04W 76/36 370/331 |
| 2015/0173100 A1* | 6/2015 | Aydin ............... | H04W 72/0426 370/329 |

FOREIGN PATENT DOCUMENTS

| | | | | |
|---|---|---|---|---|
| WO | WO-2008031258 A1 * | 3/2008 | ........ | H04W 72/0486 |
| WO | WO 2010/057198 A1 | 5/2010 | | |
| WO | 2013023735 A1 | 2/2013 | | |

OTHER PUBLICATIONS

Supplementary European Search Report for application EP 15 90 6615 dated Apr. 23, 2019, 5 pages.

Misbah Abdelsalam Misbah Emhammed et al., "Optimization Handover Procedure in IEEE 802.16E Netwok," International Journal of Scientific and Engineering Research, vol. 5, Issue 2, ISSN 2229-5518, Feb. 2014, pp. 803-808.

Sung et al., "Contention Based Fast Beam Switching Scheme in Millimeter-wave Cellular systems," 2015 17th International Conference on Advanced Communication Technology (ICACT), ISBN 978-89-9686504-9, Jul. 1-3, 2015 pp. 502-505.

* cited by examiner

ALLOCATING RADIO RESOURCES IN A CELLULAR NETWORK

CROSS REFERENCE TO RELATED APPLICATIONS

This application is a 35 U.S.C. § 371 national stage application of PCT International Application No. PCT/IN2015/050202, filed on Dec. 15, 2015, which itself claims priority to Indian Application No. 3370/DEL/2015 filed Oct. 19, 2015, the disclosure and content of both of which are incorporated herein by reference in their entireties.

TECHNICAL FIELD

The field of the invention is allocating radio resources in a cellular network.

BACKGROUND

Wireless video applications have become very popular in recent years and it is expected that this trend will continue. Despite advances in bandwidth capacity in wireless access networks, providing such services can rapidly exhaust the available resources. The wireless access network is still therefore regarded as a bottleneck and managing the resources of such networks is challenging. Fluctuations in available resources may be dealt with at handset level, using dynamic buffering of content based on the resources allocated, or at "over the top" level, such as You Tube, Netflix etc., which have their own load balancing algorithms and caches on the server side. Fluctuations in demand can be caused by new connections being established or existing ones being closed or changing their requirements. In a cellular network, demand may also vary due to handover of a user from one cell to another.

FIG. 1 is a schematic diagram of a typical cellular network. The network comprises a plurality of cells, of which two (1, 2) are illustrated. Each cell comprises a base station (3, 4). In the scenario of FIG. 1, a user equipment (5) is moving from an originating cell (1) to a destination cell (2). The destination cell comprises a plurality of other user equipments (6). The transfer of user equipment (6) from the first cell (1) to the destination cell (2) will require the provision of network resources for the moving user equipment in the destination cell. If the capacity of the destination cell is insufficient to provide both the resource requirement of the moving user equipment and an initial resource requirement comprising a sum of the resource requirements of the other users in the destination cell, the resources provided to the other users (6) will need to be reduced to provide for the new arrival. This will necessitate an allocation algorithm for distributing resources between the users.

Most prior art studies of such algorithms are focused on maximizing throughput. However, real-time applications such as video streaming are highly sensitive to dynamic changes of application requirements, such as data rate, delay, delay variation and packet loss. Solutions based on throughput can often lead to sub-optimal solutions with respect to the user-perceived quality or Quality of Experience (QoE). QoE based optimization was first proposed for elastic applications, i.e. those which can adapt their bit rate to network conditions. QoE aims to capture user satisfaction as a function of data rate using a concave utility function. A very common metric used for this purpose is the Mean Opinion Score (MOS), which is an average of subjective perception of link quality.

In addition to the sub-optimal solutions from a point of view of QoE, further problems with prior art solutions are that neither the traffic scenarios of different cells nor the timing of requirements for bandwidth are properly considered. This can result in inaccurate estimations of available bandwidth and in sudden changes in resources available to a user with a consequent perceptible reduction in QoE.

SUMMARY

Accordingly, in a first aspect of the present invention, there is provided a method of allocating radio resources in a cellular network. The method comprises the steps, by a network node associated with the destination cell, of, prior to a handover of a moving user equipment from an originating cell to a destination cell, receiving a moving user resource requirement and a predicted handover time for the moving user equipment, estimating a total resource requirement comprising a sum of the moving user resource requirement and an initial resource requirement comprising a sum of resource requirements of other user equipments in the destination cell, determining whether a capacity of the destination cell is sufficient to provide for the total resource requirement. If the capacity is not sufficient, a decrement factor is determined for each user equipment in the destination cell by determining a required resource reduction using a difference between the capacity and the total resource requirement, determining a reduction factor for each user equipment in the destination cell by allocating a portion of the required resource reduction to each user equipment, determining a number of rescheduling events that will occur before the handover time and calculating the decrement factor for each existing user equipment by dividing the reduction factor by the number of rescheduling events and at each rescheduling event, and decrementing the resources available to each user equipment by the respective decrement factor. On handover, the moving user equipment is provided with an allocated radio resource equal to at least part of the moving user resource requirement.

In an embodiment, the initial resource requirement comprises a total requirement for user equipments predicted to be in the destination cell at the handover time.

In an embodiment, upon entry to or exit from the destination cell of a new user equipment or a change in a resource requirement of an existing user equipment, the step of determining of the decrement factor is repeated, to allow for changes in resource requirements caused by the entry or exit or the change in resource requirement.

In an embodiment, the method further comprises the steps of, for each user equipment in the destination cell, determining whether the decrement factor is greater than a threshold for perceptible degradation. For each user equipment for which the decrement factor is greater than the threshold, a difference is calculated between the decrement factor and the threshold and the decrement factor is reduced by a correction factor equal to an amount less than or equal to the difference and an allocation correction factor is calculated by summing the correction factors associated with each user equipment in the destination cell. The allocated radio resource is reduced by the allocation correction factor.

In an embodiment the method further comprises, prior to handover, the step of overprovisioning the moving user equipment in the originating cell with additional resources less than or equal to the allocation correction factor.

In an embodiment the step of predicting the handover time and destination cell comprises the steps of obtaining a plurality of signal strength measurements between the moving user equipment and a plurality of base stations and for each measurement, recording the signal strength and a time of measurement determining from the plurality of signal strength measurements a direction and magnitude of a maximum rate of change of signal strength and using the magnitude and direction to predict a time and destination cell for handover.

In an embodiment, the step of estimating the reduction factor comprises the steps of identifying a first resource allocation comprising an adjusted resource allocation for each user equipment in the destination cell, wherein the first resource allocation has a resource requirement which is less than or equal to the total resource requirement less the required resource reduction. An average utility value is estimated for all the user equipments in the cell for the first resource allocation and either the first resource allocation is used to determine the reduction factor for each user equipment, or a second resource allocation is identified, wherein the second resource allocation has a resource requirement which is less than or equal to the total resource requirement less the require resource reduction. An average utility is then estimated for all the user equipments in the cell for the second resource allocation. One of the first and the second allocation is then selected, depending on which has the higher average utility. The selected allocation is used to determine the reduction factor for each user equipment.

In an embodiment, the utility value is a mean opinion score.

In an embodiment, the resource requirements are based on a Quality of Experience of a user.

According to a second aspect of the present invention, there is provided an apparatus for use in a network node in a cellular network, the apparatus comprising: processor circuitry, a storage unit storing instructions executable by said processor circuitry, a transmitter and a receiver, whereby the apparatus is operative to, receive, prior to handover of a moving user equipment to a cell associated with the network node, a moving user resource requirement and a predicted handover time for the moving user equipment, estimate a total resource requirement comprising a sum of the moving user resource requirement and an initial resource requirement comprising a sum of resource requirements of other user equipment in the destination cell, and determine whether a capacity of the destination cell is sufficient to provide for the total resource requirement. The apparatus is further operative, if the capacity is not sufficient, to determine a decrement factor for each user equipment in the destination cell by determining a required resource reduction using a difference between the capacity and the total resource requirement, determining a reduction factor for each user equipment in the destination cell by allocating a portion of the required resource reduction to each user equipment, determining a number of rescheduling events that will occur before the handover time and calculating the decrement factor for each existing user equipment by dividing the reduction factor by the number of rescheduling events. At each rescheduling event, the apparatus is operative to decrement the resources available to each user equipment by the respective decrement factor and on handover, to provide the moving user equipment with an allocated radio resource equal to at least part of the moving user resource requirement.

In an embodiment the apparatus is operative to estimate an initial resource requirement comprising a total requirement for user equipment predicted to be in the destination cell at the handover time.

In an embodiment the apparatus is further operative to repeat, upon entry to or exit from the destination cell of a new user equipment or a change in a resource requirement of an existing user equipment, the determining of the decrement factor, to allow for changes in resource requirements caused by the entry or exit or the change in resource requirement.

In an embodiment the apparatus is further configured to determine for each user equipment in the destination cell whether the decrement factor is greater than a threshold for perceivable degradation. For each existing user equipment for which the decrement factor is greater than the threshold, a difference between the decrement factor and the threshold is calculated and the decrement factor is reduced by a correction factor less than or equal to the difference. An allocation correction factor is calculated by summing the correction factors associated with each user equipment in the destination cell. The allocated radio resource is reduced by the allocation correction factor.

In an embodiment the apparatus is further configured to provide the allocation correction factor to a network node associated with an originating cell of the moving user equipment.

According to a third aspect of the present invention, there is provided an apparatus for use in a network node in a cellular network, the apparatus comprising: processor circuitry, a storage unit storing instructions executable by said processor circuitry, a transmitter and a receiver, whereby the apparatus is operative to receive from a second network node associated with a destination cell an allocation correction factor for a moving user equipment and to overprovision the moving user equipment with additional resources less than or equal to the allocation correction factor.

According to a fourth aspect of the invention there is provided a network node comprising apparatus according to the second or the third aspects of the invention.

According to a fifth aspect of the present invention, there is provided a computer program, comprising instructions which, when executed on at least one processor, cause the at least one processor to carry out a method according to the first aspect.

According to a sixth aspect of the present invention there is provided a computer program product comprising a computer program according to the fifth aspect.

According to a seventh aspect of the present invention there is provided a carrier containing the computer program according to the sixth aspect, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The term "user equipment" is used to refer to any mobile device that may be used to connect to a wireless access network. It includes for example mobile telephony handsets, tablets, computers and vehicles configured with cellular network capability. A "network node" is any connection point, redistribution point or communication endpoint in either the access or the core network. The term may include for example a base station, NodeB, eNodeB, Wi-Fi access point, Radio Node Controller (RNC), Mobility Management Entity (MME), gateway and server. Where there is a reference to a network node being associated with a cell, the meaning incorporates any point in a network in which decisions concerning a cell and access to that cell's resources are made. The term "resources" refers to any measure of network capacity, such as bandwidth, which is allocated to a user equipment to enable transmission of a communication.

The present invention seeks to overcome a number of problems with the prior art. In addition to the problem of lack of optimization of resources in terms of quality of experience, a further problem is the sudden change in perceived quality that can occur on the entry of a new user equipment into a cell and the consequent reduction in resources for other user equipments that results. Another problem is that estimations of required resource reduction can provide inaccurate due to other user equipments entering or leaving the cell between resource estimation and entry of a moving user equipment to the cell. A solution to these problems comprises an iterative reduction in the resources allocated to each existing user equipment and a repeating of the process for each new user equipment entering the cell. Furthermore, the use of algorithms based on Quality of Experience (QoE) addresses the issue of non-optimal allocation of resources.

Figure 1:
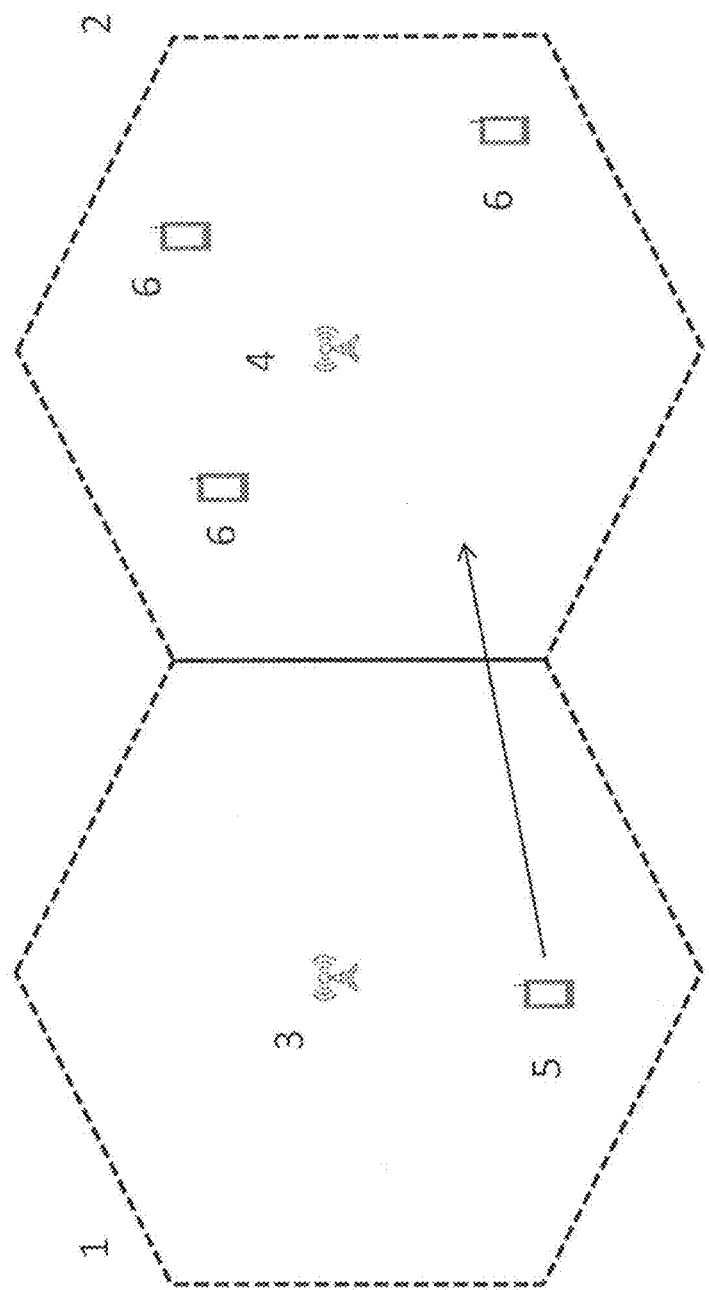
FIG. 1 is a schematic diagram showing two cells of a network.
Figure 2:
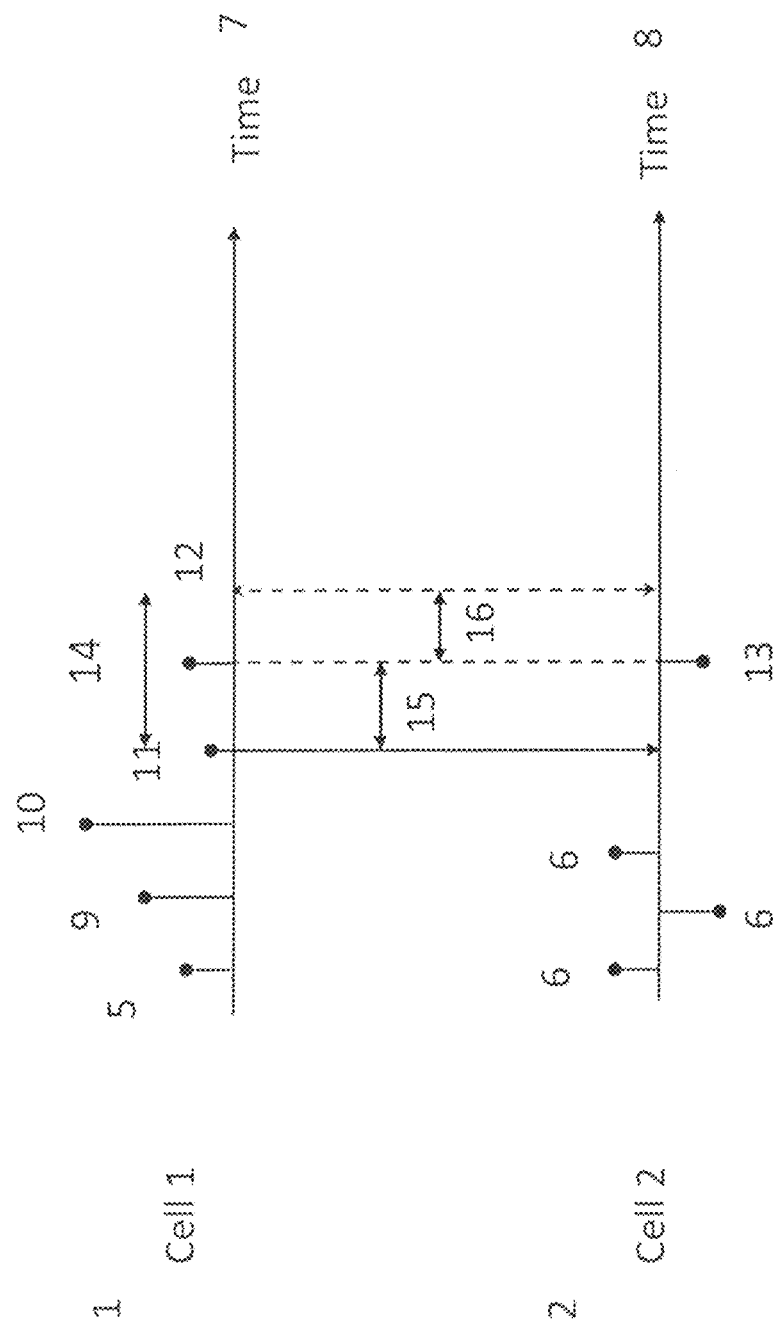
FIG. 2 is a time line diagram showing a user equipment moving from one cell to another.

FIG. 2 is a time line diagram illustrating the process of transfer of the moving user equipment (5) from the originating cell (1) to the destination cell (2). Referring to the time line of the originating cell (7), at the start, moving user equipment (5) is located in the originating cell, but is moving and a mobility prediction (9) is being made to estimate a time of leaving the originating cell and to determine to which cell it will be transferred. A resource requirement estimation is made (10) and this is sent (11) to the destination cell so that it may determine its resource requirements. The new allocation of resources needs to be implemented by the time the moving user equipment is predicted to enter the destination cell (12). The timeline (8) of the destination cell shows the entry of other user equipments (6) before prediction of the entry to the cell of the moving user equipment, either from other cells or due to new calls being made. On receipt of the resource requirements for the moving user equipment (5), the resource allocation for the destination cell is determined. Existing systems which reallocate resources upon entry of a moving user equipment into a destination cell can cause a problem for existing user equipments, because when a sudden reduction in resources occurs, a perceptible reduction in quality of experience can result. In order to address this problem, in an embodiment, the reduction in resources to existing user equipments takes place decrementally over a period (14) between the sending of the new user equipment's resource requirements and the entry of the new user equipment to the destination cell.

A further problem can occur when changes are required due to other network events (13) such new user equipments entering or leaving the cell or user equipments changing their requirements between the determination of the requirements of the moving user equipment (11) and its entry into the destination cell (12). The dynamic nature of the radio environment means that errors are introduced in the estimated resources, which can be qualitatively expressed as in equation 1.

$$\text{Error} = f(\text{User\_mobility}, \text{SINR}, \text{etc}) \qquad \text{Equation 1}$$

In order to address further changes in the resource requirements caused by further entries or exits from the cell (13), in an embodiment, the resource allocation comprises repeating of the resource allocation algorithm, iterating over the period (14) between the original estimation of resource requirements and the arrival of the moving user equipment in the destination cell. In this example, with a single new event (13), the change required in required resources will change between a first period (15) between the first estimation (11) and the new event (13) and a second period (16) between the new event and the entry of the moving user equipment into the destination cell. The person skilled in the art will appreciate that this is one example and multiple such intervening events may occur.

Figure 3:
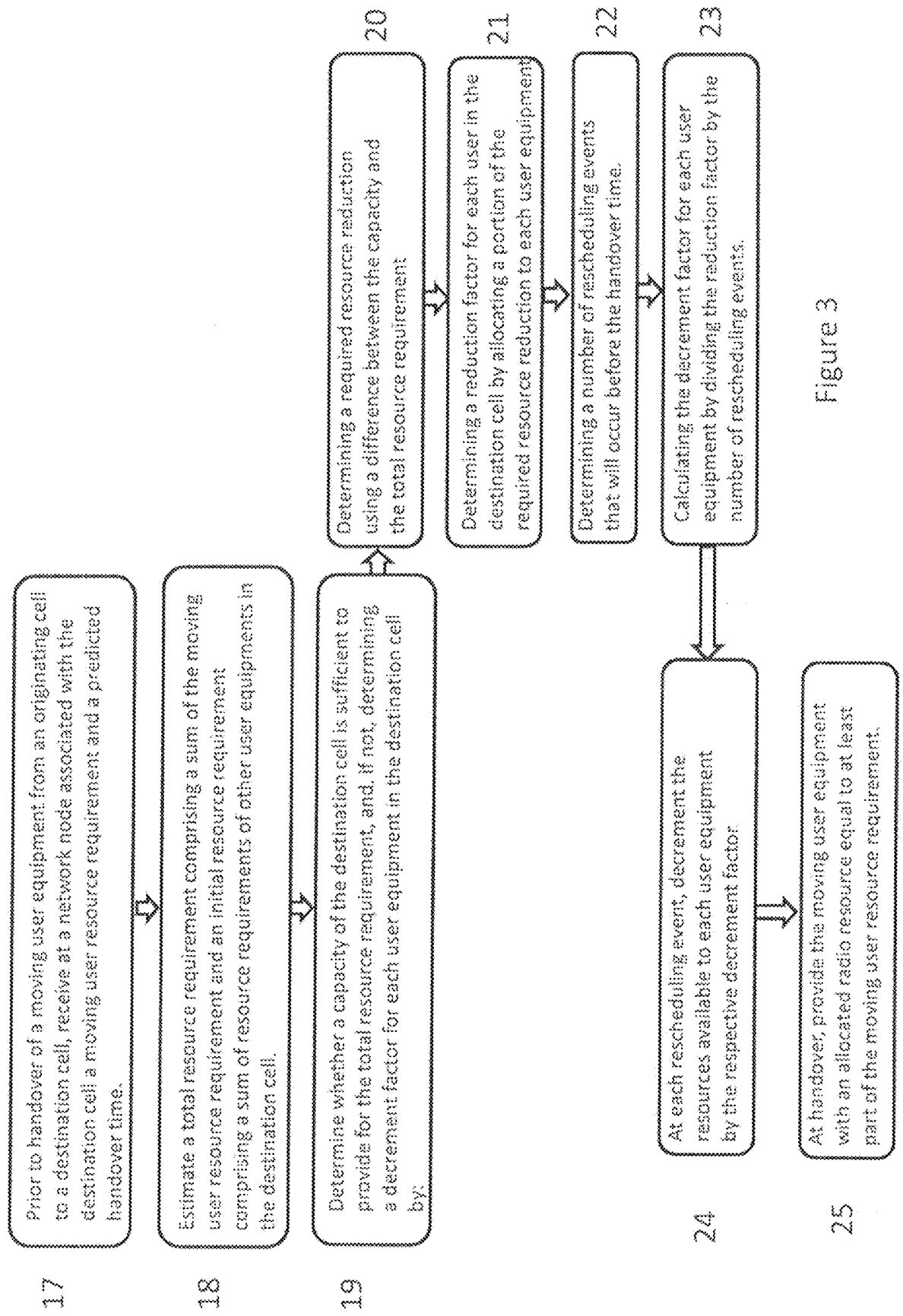
FIG. 3 is a flow chart of a method of resource allocation according to an embodiment.

FIG. 3 is a flow chart showing the steps of a method according to an embodiment of the invention. Prior to the handover of a moving user equipment from an originating cell to a destination cell, a network node associated with the destination cell receives (17) a resource requirement for the moving user equipment and a predicted handover time. An estimate is made (18) of the total resource requirement comprising a sum of the moving user equipment's requirement and an initial requirement comprising the sum of the resource requirements of all the existing user equipment in the destination cell. It is then determined (19) whether the capacity of the destination cell is sufficient to provide for the total resource requirement. If it is not, then a resource reduction requirement is determined (20) using a difference between the required resources and the capacity of the cell. A portion of the resource reduction requirement is then allocated to each user equipment in the cell (21). The number of rescheduling events that will occur before the predicted time of handover is determined (22) and a decrement factor is calculated (23) by dividing the reduction factor by the number of rescheduling events. At each rescheduling event, the resources allocated to each user equipment is reduced (24) by the respective decrement factor. At handover, the moving user equipment is provided (25) with allocated radio resource equal to at least part of its resource requirement.

Figure 4:
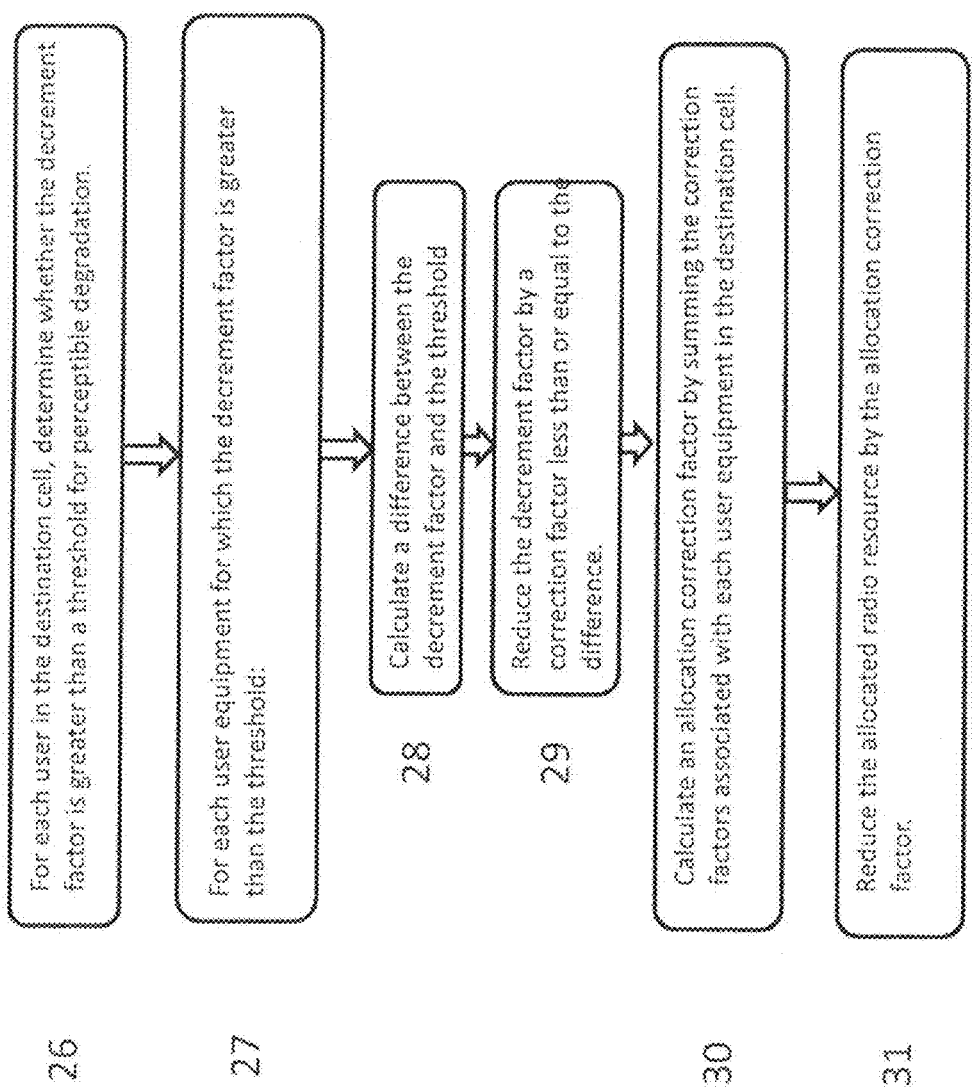
FIG. 4 is a flow chart of a method of ensuring reduction in resources is below a threshold of perceptible degradation according to an embodiment.

Although this method may provide an optimal solution to the distribution of network resources, it may be unsatisfactory if the reductions in resource allocation to existing user equipments in a cell results in a perceptible degradation in quality of experience. In order to prevent such an occurrence, in an embodiment, a limitation is placed on the amount by which a user equipment's requirements may be reduced in any time period. FIG. 4 is a flow chart showing the steps of a method of ensuring that the decrement factor will not be greater than a threshold for perceptible degradation according to an embodiment. For each user equipment in the destination cell, the decrement factor determined for the user equipment is compared (26) with a threshold which represents a perceptible level of degradation. For each user equipment for which the decrement factor is greater than the threshold (27), a difference is calculated (28) between the decrement factor and the threshold. The decrement factor is then reduced (29) by a correction factor less than or equal to this difference. An allocation correction factor (30) is then calculated by summing all of the correction factors for the user equipments of the destination cell. The allocated radio resources for the moving user equipment are then reduced (31) by an amount equal to the allocation correction factor. This limitation of the amount of resources which is available for the moving user equipment will result in a reduction in the quality of experience. In an embodiment, this effect may be partially or totally mitigated by overprovisioning of resources in the moving user equipment's present cell. The overprovisioning the moving user equipment in the originating cell with additional resources less than or equal to the allocation correction factor enables the buffering of extra data at the user equipment. This at least partially compensates for the less than ideal provision of resources in the new cell.

In an embodiment, the correction factor is equal to at least part of the difference between the decrement factor and the threshold. In another embodiment, the correction factor is equal to the difference. In an embodiment, the correction factor is determined by the overall resources available in the cell, the level of the correction factors and the resources required by user equipments entering the cell.

In an embodiment, the additional resources are equal to at least part of the allocation correction factor. In another embodiment, the additional resources are equal to the allocation correction factor. In an embodiment, the amount of additional resources is set as close as possible to the allocation correction factor and depends on the resources available in the originating cell.

Figure 5:
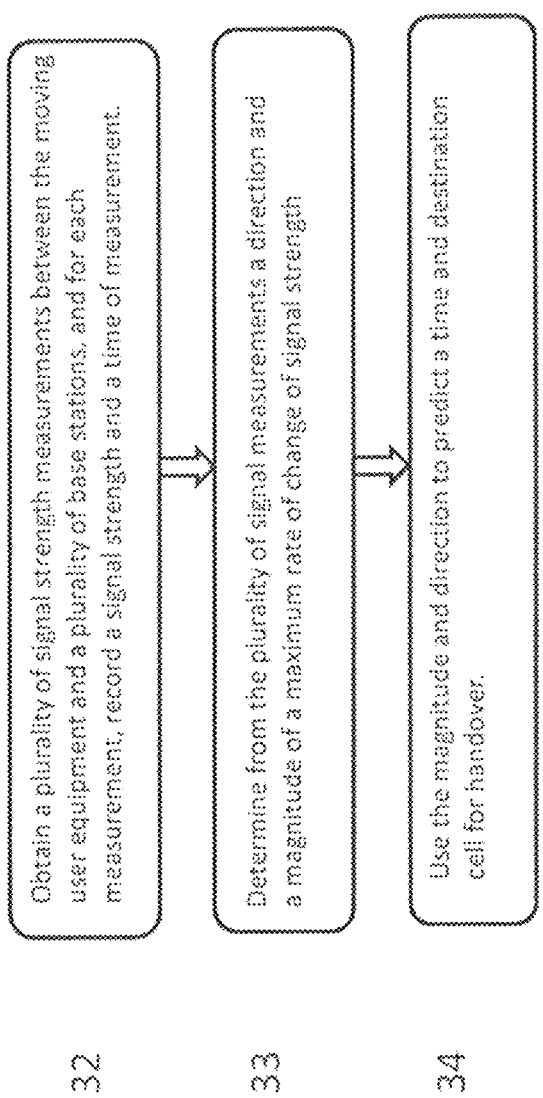
FIG. 5 is a flow chart of a method of estimating handover time and destination cell.

A reasonably accurate prediction of the destination cell and the time of handover assists in optimising the allocation of resources. In an embodiment this is achieved by using signal strength measurements between user equipments and nearby base stations. FIG. 5 is a flow chart of a method, according to an embodiment, of estimating at a network node the time of handover of the moving user equipment from the originating cell to the destination cell. A plurality of signal strength measurements between the moving user equipment and a plurality of base stations is obtained (32). A direction and magnitude of a maximum rate of change of signal strength is determined (33) at the network node. Using this magnitude and direction, a time and destination cell are predicted for the moving user equipment (34).

In an embodiment, the optimum resources needed by a user equipment is based on a Quality of Experience (QoE) measurement. In an embodiment, the QoE is measured by means of a Mean Opinion Score (MOS), which is used as a common metric for user perceived quality measurement. It uses a scale of 1-5 which rates the quality of service from bad to excellent. The person skilled in the art will appreciate that this is an arbitrary scale and alternatives can be developed to serve the same purpose. The invention is not limited to any one measure of quality of experience.

In an embodiment, a rate adaptation algorithm is used as part of the resource scheduler. This ensures that user equipments are allocated with resources to provide a Quality of Service (QOS) in line with their expected Quality of Experience (QoE). In an embodiment, an allocation of resources is implemented based on maximising an average utility of all user equipments. The concept of utility derives from economic utility and gives a measure of perceived benefit plotted against increasing bit rate for an application. The variation in utility with bit rate generally follows the pattern of rapidly increasing utility at low bit rates, where small increases can result in very significant increases in perceptible quality, following by a flattening of the slope as bit rates increase further, with little perceived benefit of increasing resources at very high bit rates. The variation is however different for different types of application, for example, the perceived quality of highly dynamic video scenes, typical for example of sports, is more sensitive to bit rate variation than more static scenes, such as news reporting.

In a cell with K user equipments, in which the utility of user equipment k is given by $U_k$ and $\alpha_k$ is the proportion of network resources allocated to user equipment k, the resource allocation algorithm seeks to maximise the average utility. The average utility is given by equation 2 below.

$$\text{Average\_utility} = \frac{1}{K} \cdot \sum_{k=1}^{K} U_k(\alpha_k) \qquad \text{Equation 2}$$

The utility function is precomputed at an application server prior to its use for resource allocation.

The optimum allocation is then given by the distribution of resources corresponding to the argmax function of the average utility. This is given by equation 3 below.

$$\alpha_{opt} = \text{argmax}\left(\frac{1}{K} \cdot \sum_{k=1}^{K} U_k(\alpha_k)\right) \qquad \text{Equation 3}$$

This is subject to the constraint of equation 4.

$$\Sigma_{k=1}^{K} \alpha_k = 1 \qquad \text{Equation 4}$$

Figure 6:
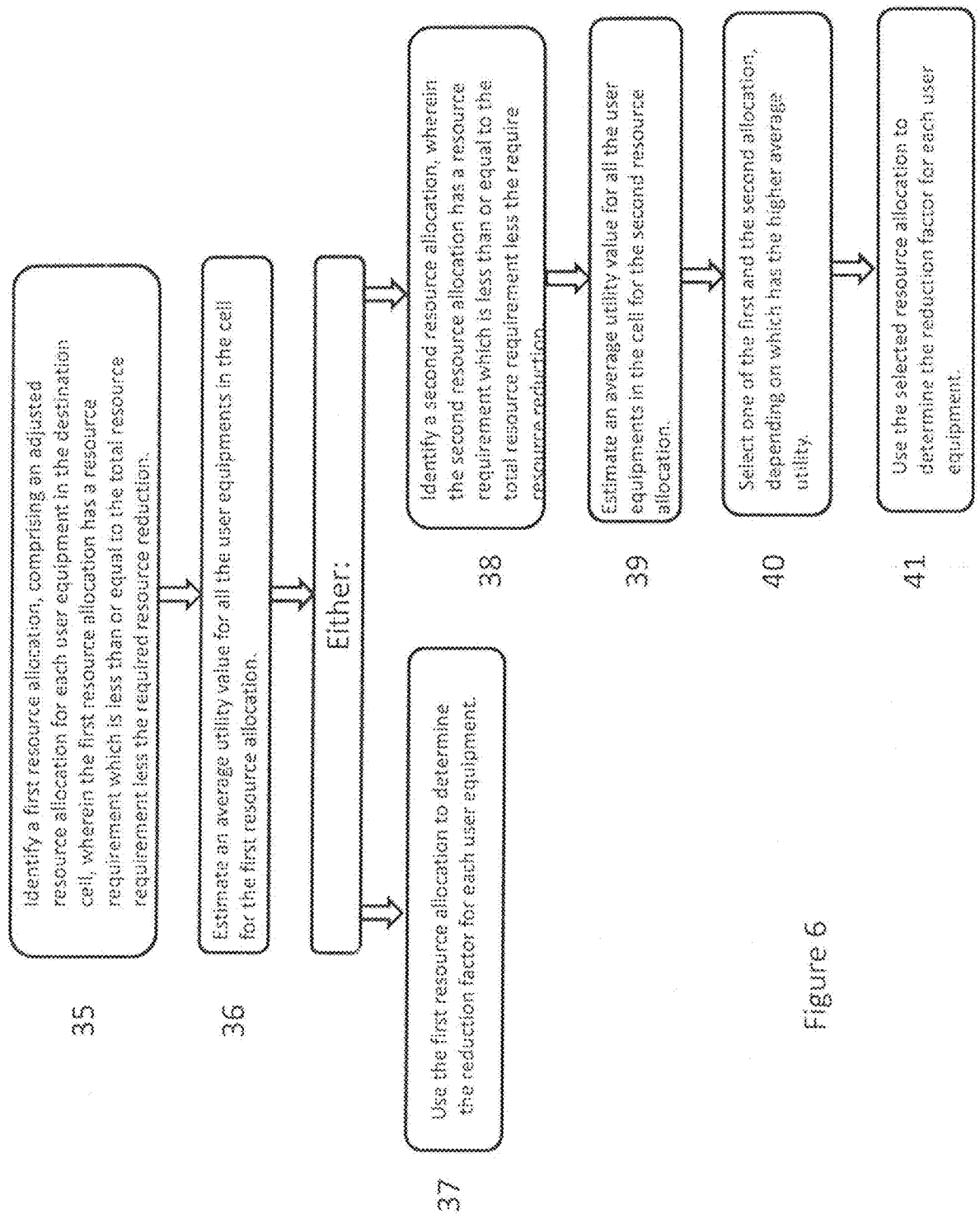
FIG. 6 is a flow chart of a resource allocation algorithm.

FIG. 6 is a flow chart showing the steps of an algorithm used for resource scheduling according to an embodiment. The purpose of the algorithm is to determine a maximum utility for the available network resources and the resources required by the user equipments. A first resource allocation is identified (35) for the capacity and required resources, comprising an adjusted resource allocation for each user equipment in the destination cell. The first allocation has a resource requirement that is less than or equal to the total resource requirement less the required resource reduction. An average utility is estimated (36) for all the user equipments in the cell for the first resource allocation, whereupon either the first resource allocation is used (37) or a second resource allocation is identified (38), the second resource allocation having a resource requirement that is less than or equal to the total resource requirement less the required resource reduction. An average utility is estimated (39) for all the user equipments of the cell for the second resource allocation. A selection is made (40) of either the first or the second resource allocation depending on which of the allocations has the higher utility. The selected resource allocation is then used to determine the reduction factor (41) for each user equipment. In an embodiment, a greedy search algorithm is used to determine the allocation. In an embodiment, a target mean utility algorithm as described in Shehad et al. ("QoE-based Cross-layer optimization for video delivery in Long Term Evolution Mobile Networks") may be used. The person skilled in the art will appreciate that other algorithms, such as genetic algorithms, may be used. The invention is not limited to any one type of allocation algorithm.

Figure 7:
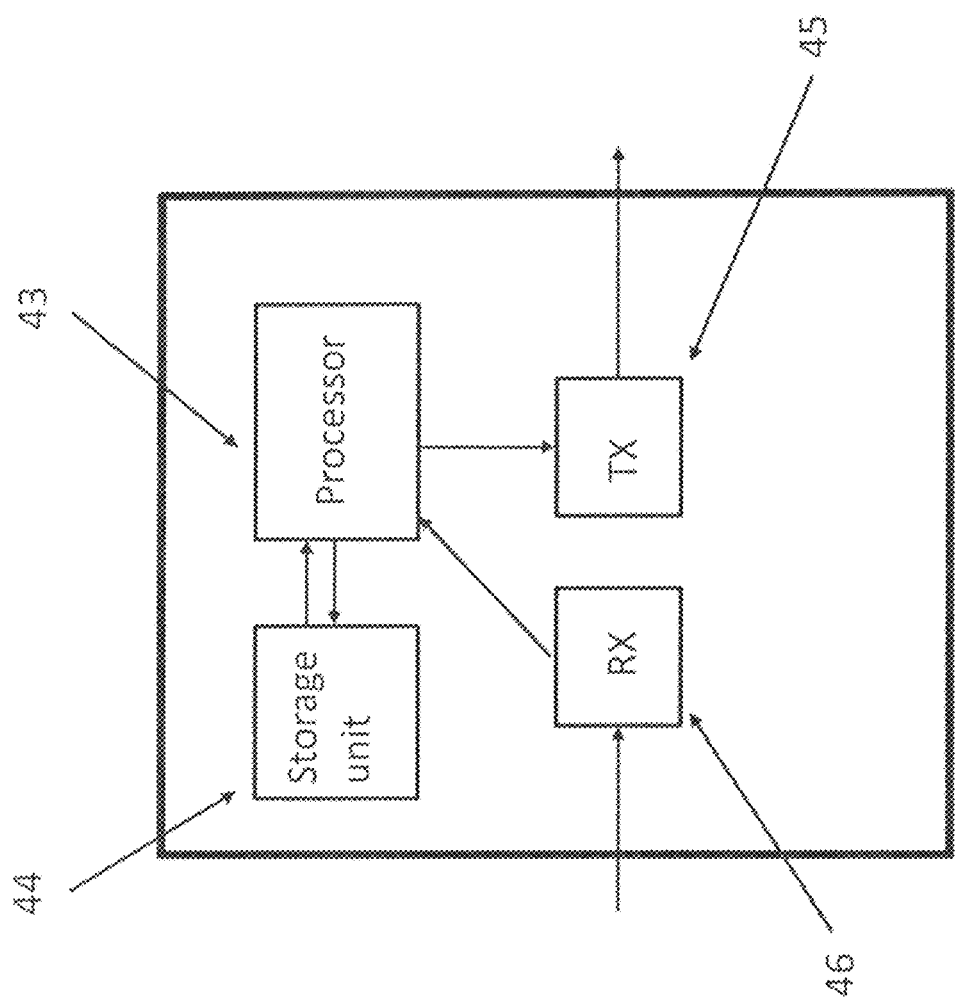
FIG. 7 is a schematic diagram of an apparatus for use in a network node of a cellular system according to an embodiment.

FIG. 7 is a schematic diagram of an apparatus (42) for use in a network node in a cellular network and comprises processor circuitry (43), a storage unit (44) storing instructions executable by the processor circuitry, a transmitter (45) and a receiver (46). The apparatus is operative to receive, prior to handover of a moving user equipment to a cell associated with the network node, a moving user resource requirement and a predicted handover time for the moving user equipment, to estimate a total resource requirement comprising a sum of the moving user resource requirement and an initial resource requirement comprising a sum of resource requirements of other user equipments in the destination cell and to determine whether a capacity of the destination cell is sufficient to provide for the total resource requirement. The apparatus is further operative, if the capacity of the destination cell is not sufficient to provide for the total resource requirement, to determine a decrement factor for each user equipment in the destination cell by the steps of:
- determining a required resource reduction using a difference between the capacity and the total resource requirement;
- determining a reduction factor for each user equipment in the destination cell by allocating a portion of the required resource reduction to each user equipment;
- determining a number of rescheduling events that will occur before the handover time; and
- calculating the decrement factor for each existing user equipment by dividing the reduction factor by the number of rescheduling events.

The apparatus is further operative to decrement the resources available to each user equipment by the respective decrement factor at each rescheduling event. On handover of the moving user equipment, the apparatus is operative to provide the moving user equipment with an allocated radio resource equal to at least part of the moving user resource requirement.

In an embodiment, the apparatus of FIG. 7 is further operative to estimate an initial resource requirement comprising a total requirement for user equipments predicted to be in the destination cell at the handover time. In an embodiment, the apparatus of FIG. 7 is further operative to repeat, upon entry to or exit from the destination cell of a new user equipment or a change in a resource requirement of an existing user equipment, the determining of the decrement factor, to allow for changes in resource requirements caused by the entry or exit or the change in resource requirement. In an embodiment the apparatus of FIG. 7 is further operative to implement the method of FIG. 4. In an embodiment, the apparatus of FIG. 7 is further operative to implement the method of FIG. 5. In an embodiment, the apparatus of FIG. 7 is further operative to implement the method of FIG. 6. The apparatus of FIG. 7 may be operative to implement any appropriate resource allocation algorithm. The apparatus of FIG. 6 may be further operative to provide the allocation correction factor to a network node associated with an originating cell of the moving user equipment.

Figure 8:
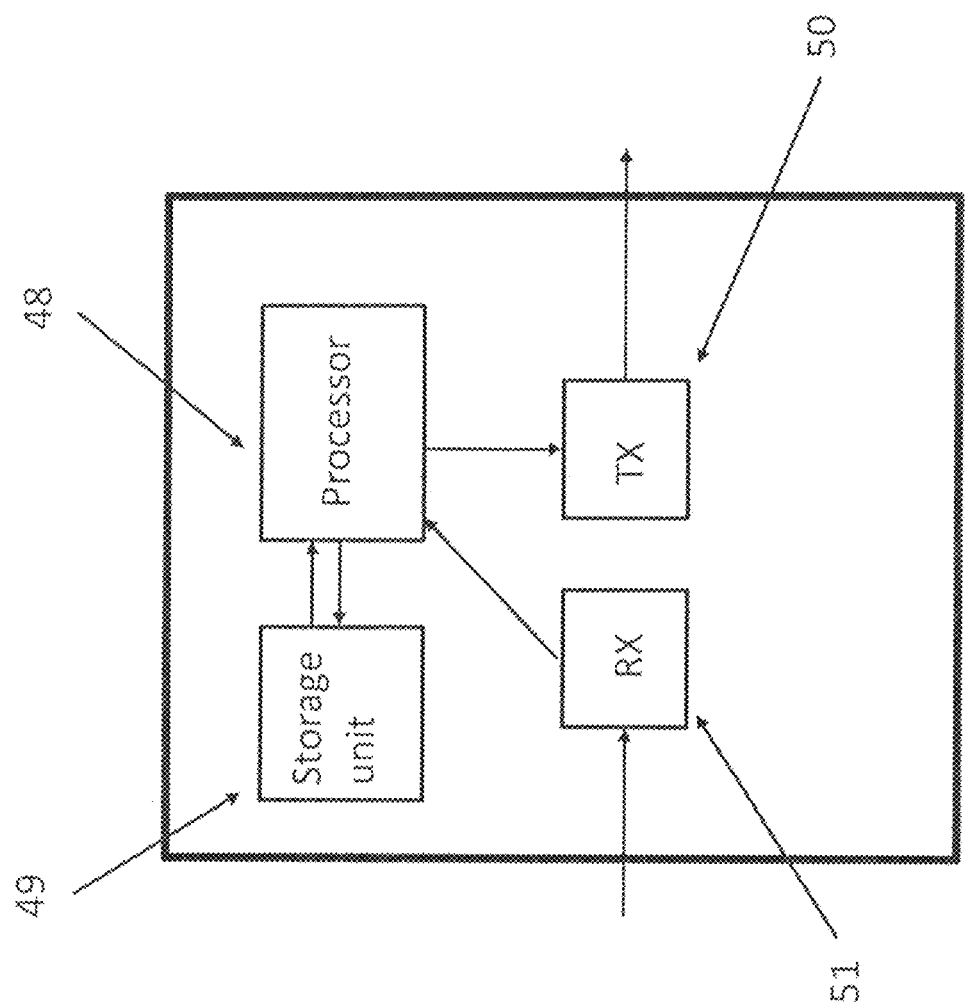
FIG. 8 is a schematic diagram of another apparatus for use in a network node of a cellular system according to an embodiment.

FIG. 8 is a schematic diagram of an apparatus (47) for use in a network node in a cellular network and comprises processor circuitry (48), a storage unit (49) storing instructions executable by the processor circuitry, a transmitter (50) and a receiver (51). The apparatus is operative to receive from a second network node associated with a destination cell an allocation correction factor for a moving user equipment and to overprovision the moving user equipment with additional resources less than or equal to the allocation correction factor.

Figure 9:
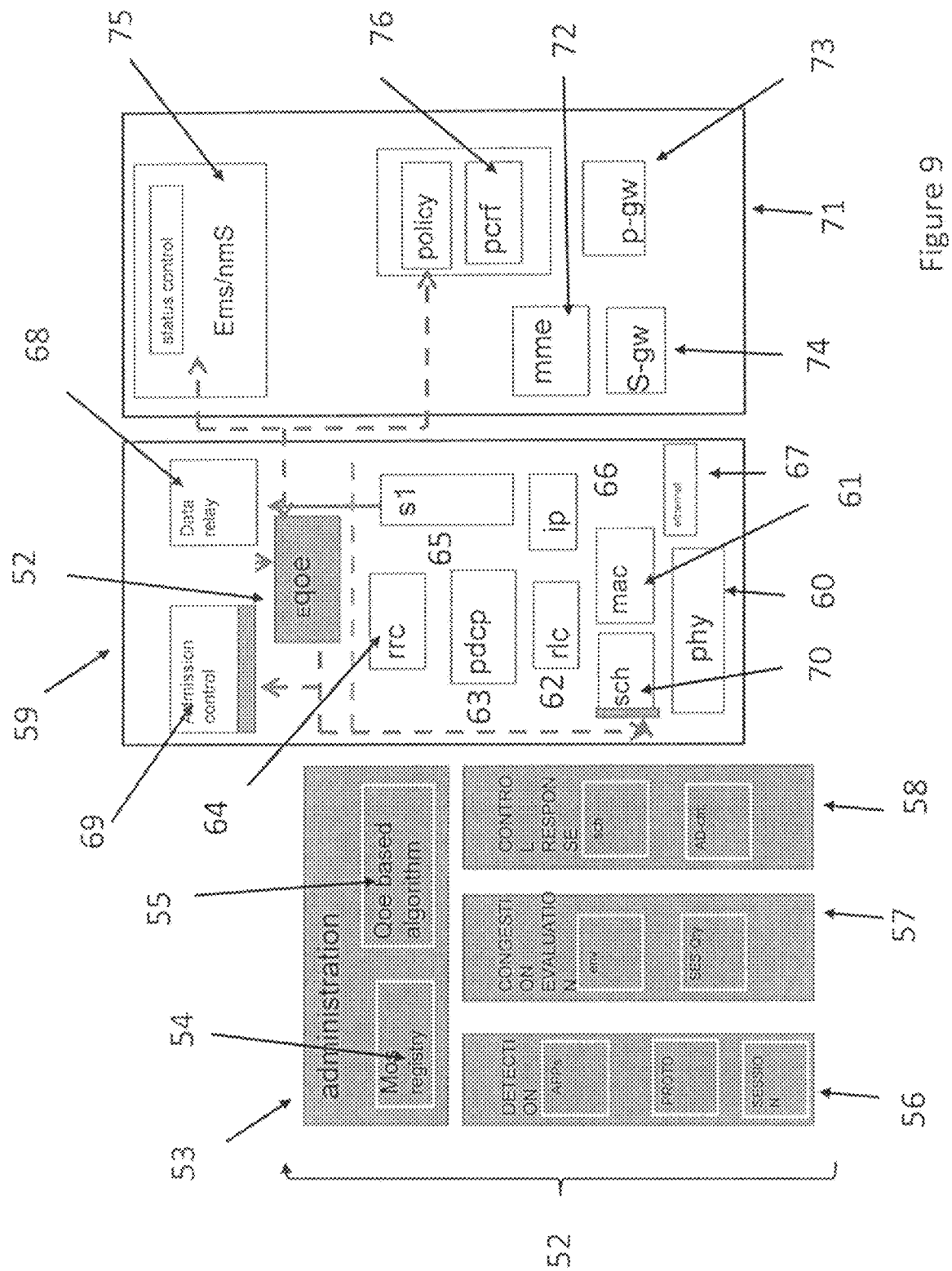
FIG. 9 is a schematic diagram of a Long term Evolution (LTE) architecture comprising a mechanism according to an embodiment of the invention.

FIG. 9 is a schematic diagram of a Long term Evolution (LTE) architecture comprising a mechanism according to an embodiment of the invention. The evolved Quality of Experience (eQoE) (52) module is the proposed intelligent component in the LTE into which the disclosed solution fits. The eQoE comprises an administration module (53), which comprises a Mean Opinion Score (MOS) registry (54) and a QoE based algorithm (55). The MOS Registry stores the categories of video and their respective minimum bandwidth value to ensure Quality of Experience.

The algorithm makes use of a detection module (56), a congestion evaluation module (57) and a control response (58). The interaction of the eQoE (52) with the protocol stack (59) is also shown. The protocol stack comprises the typical layers, including physical layer (60), Medium access control (MAC) layer (61), Radio Link Control (RLC) (62), Packet Data Convergence Layer (PDCL) (63), Radio Resource Control (RRC) (64), S1 layer (65), Internet Protocol (IP) layer (66) and Ethernet (67). Further LTE components are shown, such as the data relay (68). The interaction of the eQoE with the admission control (69) and the MAC layer scheduler (70) is shown. A schematic diagram of an LTE network (71) is also shown, showing components of the LTE, such as the Mobility Management Element (MME) (72), Packet Gateway (P-GW) (73) and the Serving Gateway (S-GW) (74). The interaction of the eQoE with the network management (75) and the Policy Charging and Rules Function (PCRF) (76) is shown.

Figure 10:
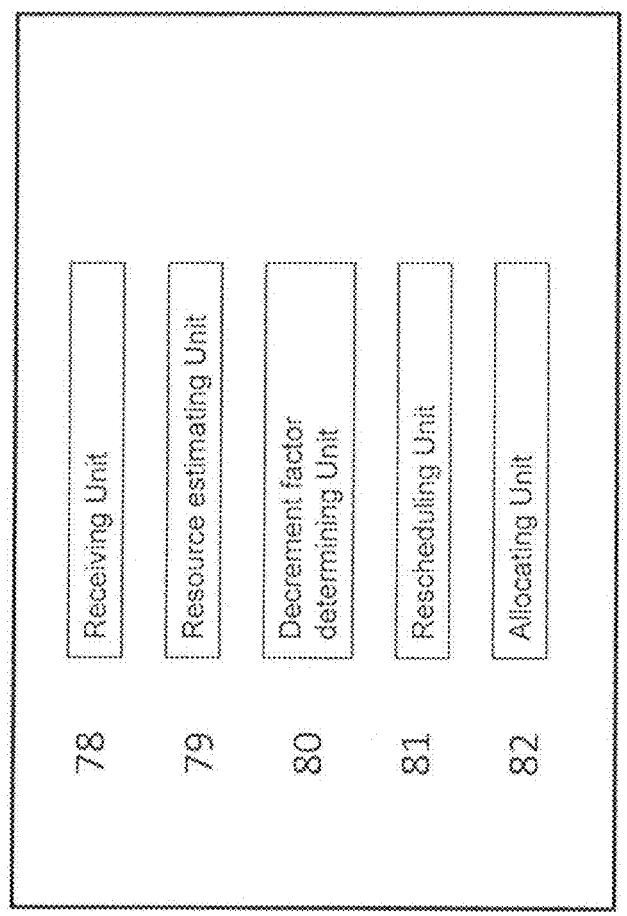
FIG. 10 is a schematic diagram of a network node comprising modules for implementing a method according to an embodiment.

FIG. 10 is a schematic diagram showing a network node (77) comprising modules for implementing a resource allocation algorithm according to an embodiment. In the embodiment, the network node comprises a receiving unit (78), a resource estimating unit (79), a decrement factor determining unit (80), a rescheduling unit (81) and an allocating unit (82). The receiving unit (78) receives, prior to handover of a moving user equipment to a cell associated with the network node, a moving user resource requirement and a predicted handover time for the moving user equipment. The resource estimating unit (79) estimates a total resource requirement comprising a sum of the moving user resource requirement and an initial resource requirement comprising a sum of resource requirements of other user equipments in the destination cell. The decrement factor determining unit (80) for determines whether a capacity of the destination cell is sufficient to provide for the total resource requirement, and, if not, determines a decrement factor for each user equipment in the destination cell by implementing the following steps:

determining a required resource reduction using a difference between the capacity and the total resource requirement;

determining a reduction factor for each user equipment in the destination cell by allocating a portion of the required resource reduction to each user equipment;

determining a number of rescheduling events that will occur before the handover time; and calculating the decrement factor for each existing user equipment by dividing the reduction factor by the number of rescheduling events.

The rescheduling unit decrements, at each rescheduling event, the resources available to each user equipment by the respective decrement factor and the allocating unit, on handover, provides the moving user equipment with an allocated radio resource equal to at least part of the moving user resource requirement.

In an embodiment, the resource estimating unit (79) estimates an initial resource requirement comprising a total requirement for user equipments predicted to be in the destination cell at the handover time. In an embodiment, the decrement determining unit repeats the determining of the decrement factor, to allow for changes in resource requirements caused by the entry or exit or the change in resource requirement. In an embodiment, the decrement determining unit preforms this repetition upon entry to or exit from the destination cell of the new user equipment or the change in a resource requirement of an existing user equipment.

Figure 11:
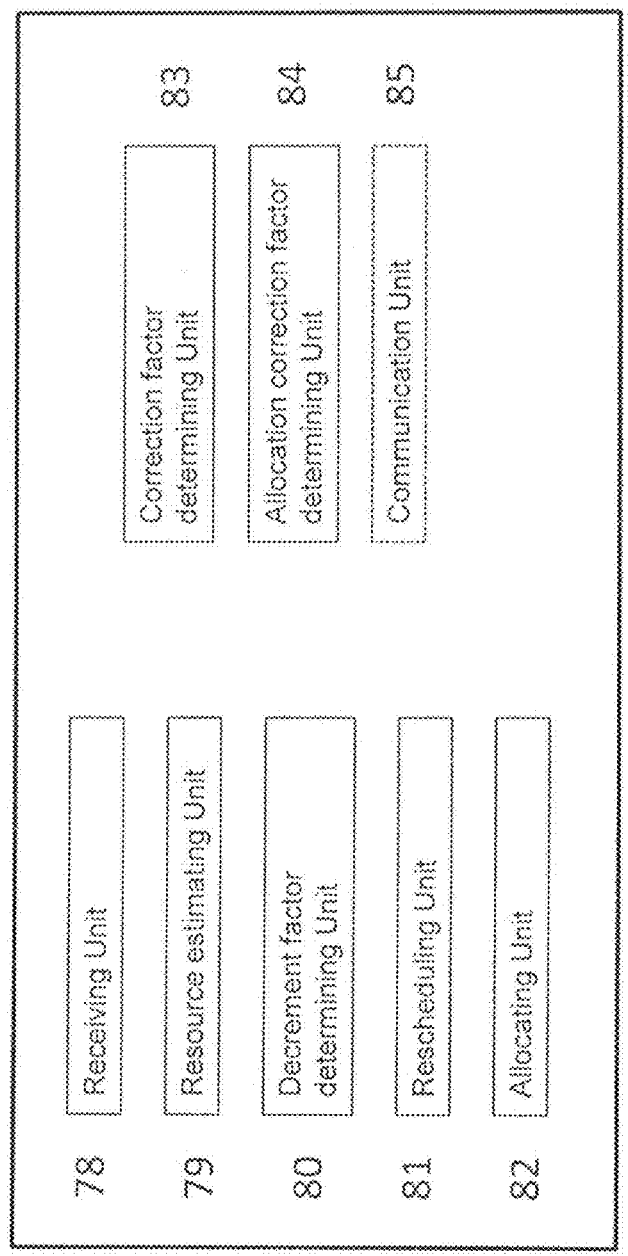
FIG. 11 is a schematic diagram of a network node comprising modules for implementing a method according to another embodiment.

FIG. 11 is a schematic diagram of a network node (77) comprising modules for implementing a method according to another embodiment. In this embodiment, in addition to the receiving unit (78), the resource estimating unit (79), the decrement factor determining unit (80), the rescheduling unit (81) and the allocating unit (82), the network node has a correction factor determining unit (83) and an allocation correction factor determining node (84). The correction factor determining unit determines, for each user equipment in the destination cell, whether the decrement factor is greater than a threshold for perceivable degradation and, for each existing user equipment for which the decrement factor is greater than the threshold, calculates a difference between the decrement factor and the threshold and reduces the decrement factor by a correction factor less than or equal to the difference. The allocation correction factor unit calculates an allocation correction factor by summing the correction factors associated with each user equipment in the destination cell and reduces the allocated radio resource by the allocation correction factor. In an embodiment, the network node further comprises a communication unit (85), wherein the communication unit to transmits the allocation correction factor to a network node associated with an originating cell of the moving user equipment.

Figure 12:
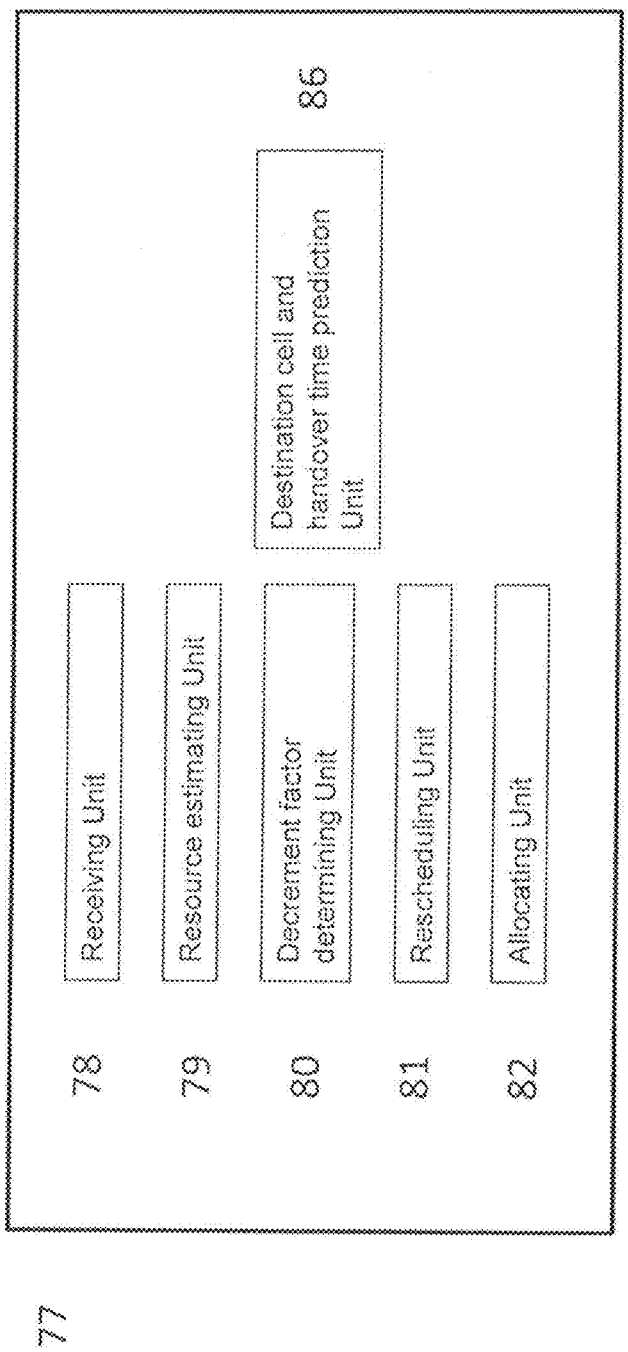
FIG. 12 is a schematic diagram of a network node comprising modules for implementing a method according to yet another embodiment.

FIG. 12 is a schematic diagram of a network node (77) comprising modules for implementing a method according to another embodiment. In this embodiment, in addition to the receiving unit (78), the resource estimating unit (79), the decrement factor determining unit (80), the rescheduling unit (81) and the allocating unit (82), the network node has a destination cell and handover time prediction unit (86) for predicting a destination cell and handover time of the moving user equipment by obtaining a plurality of signal strength measurements between the moving user equipment and a plurality of base stations and for each measurement, recording the signal strength and a time of measurement, determining from the plurality of signal strength measurements a direction and magnitude of a maximum rate of change of signal strength and using the magnitude and direction to predict a time and destination cell for handover.

Figure 13:
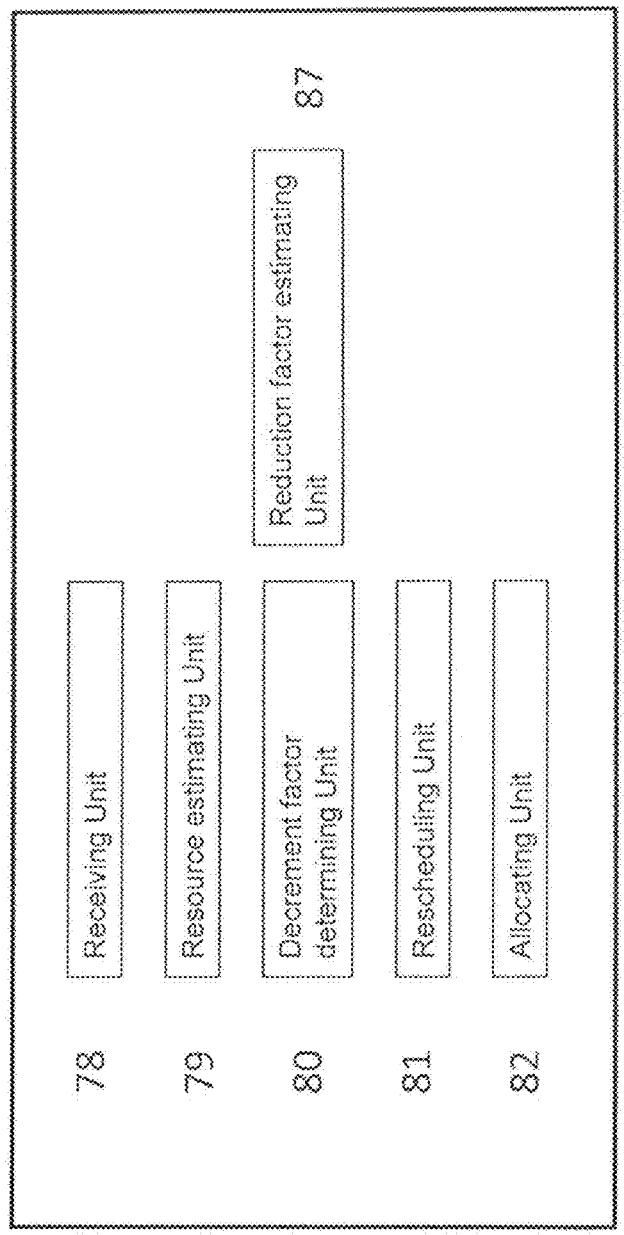
FIG. 13 is a schematic diagram of a network node comprising modules for implementing a method according to yet another embodiment.

FIG. 13 is a schematic diagram of a network node (77) comprising modules for implementing a method according to another embodiment. In this embodiment, in addition to the receiving unit (78), the resource estimating unit (79), the decrement factor determining unit (80), the rescheduling unit (81) and the allocating unit (82), the network node has a a reduction factor estimating unit (87) for estimating the reduction factor by identifying a first resource allocation, comprising an adjusted resource allocation for each user in the destination cell, wherein the first resource allocation has a resource requirement which is less than or equal to the total resource requirement less the require resource reduction, estimating an average utility value for all the users in the cell for the first resource allocation, and either: using the first resource allocation to determine the reduction factor for each user; or identifying a second resource allocation, wherein the second resource allocation has a resource requirement which is less than or equal to the total resource requirement less the require resource reduction, estimating an average utility for all the users in the cell for the second resource allocation, selecting one of the first and the second allocation, depending on which has the higher average utility and using the selected allocation to determine the reduction factor for each user. In an embodiment, the utility value is estimated using a mean opinion score.

In addition to the above described embodiments, the invention may be implemented in the following embodiments, described in the numbered paragraphs below:

1. A network node comprising:

a receiving unit for receiving, prior to handover of a moving user equipment to a cell associated with the network node, a moving user resource requirement and a predicted handover time for the moving user equipment;

a resource estimating unit for estimating a total resource requirement comprising a sum of the moving user resource requirement and an initial resource requirement comprising a sum of resource requirements of other user equipments in the destination cell;

a decrement factor determining unit for determining whether a capacity of the destination cell is sufficient to provide for the total resource requirement, and, if not, determining a decrement factor for each user equipment in the destination cell by:

determining a required resource reduction using a difference between the capacity and the total resource requirement;

determining a reduction factor for each user equipment in the destination cell by allocating a portion of the required resource reduction to each user equipment;

determining a number of rescheduling events that will occur before the handover time; and calculating the decrement factor for each existing user equipment by dividing the reduction factor by the number of rescheduling events; and a rescheduling unit for, at each rescheduling event, decrementing the resources available to each user equipment by the respective decrement factor; and an allocating unit for, on handover, providing the moving user equipment with an allocated radio resource equal to at least part of the moving user resource requirement.
2. A network node as disclosed in paragraph 1, wherein the resource estimating unit estimates an initial resource requirement comprising a total requirement for user equipments predicted to be in the destination cell at the handover time.
3. A network node as disclosed in paragraph 1 or paragraph 2, wherein, upon entry to or exit from the destination cell of a new user equipment or a change in a resource requirement of an existing user equipment, the decrement determining unit repeats the determining of the decrement factor, to allow for changes in resource requirements caused by the entry or exit or the change in resource requirement.
4. A network node as disclosed in any of the previous numbered paragraphs further comprising:
 a correction factor determining unit for determining for each user equipment in the destination cell whether the decrement factor is greater than a threshold for perceivable degradation and, for each existing user equipment for which the decrement factor is greater than the threshold, calculating a difference between the decrement factor and the threshold and reducing the decrement factor by a correction factor less than or equal to the difference; and
 an allocation correction factor unit for calculating an allocation correction factor by summing the correction factors associated with each user equipment in the destination cell and reducing the allocated radio resource by the allocation correction factor.
5. A network node as disclosed in any of the previous numbered paragraphs, further comprising a communication unit for providing the allocation correction factor to a network node associated with an originating cell of the moving user equipment.
6. A network node as disclosed in any of the preceding numbered paragraphs, further comprising a destination cell and handover time prediction unit (86) for predicting a destination cell and handover time of the moving user equipment by obtaining a plurality of signal strength measurements between the moving user equipment and a plurality of base stations and for each measurement, recording the signal strength and a time of measurement, determining from the plurality of signal strength measurements a direction and magnitude of a maximum rate of change of signal strength and using the magnitude and direction to predict a time and destination cell for handover.
7. A network node as disclosed in any of the previous numbered paragraphs, further comprising a reduction factor estimating unit (87) for estimating the reduction factor by identifying a first resource allocation, comprising an adjusted resource allocation for each user in the destination cell, wherein the first resource allocation has a resource requirement which is less than or equal to the total resource requirement less the required resource reduction, estimating an average utility value for all the users in the cell for the first resource allocation, and either: using the first resource allocation to determine the reduction factor for each user; or identifying a second resource allocation, wherein the second resource allocation has a resource requirement which is less than or equal to the total resource requirement less the require resource reduction, estimating an average utility for all the users in the cell for the second resource allocation, selecting one of the first and the second allocation, depending on which has the higher average utility and using the selected allocation to determine the reduction factor for each user.
8. A network node as disclosed in numbered paragraph 7, in which the reduction factor estimating unit uses mean opinion score for estimating the utility value.
9. A network node as disclosed in any of the preceding numbered paragraphs, in which the resource estimating unit estimates a resource requirements using a Quality of Experience of a user.

The invention claimed is:
1. A method of allocating radio resources in a cellular network, the method comprising the steps of:
 prior to a handover of a moving user equipment from an originating cell to a destination cell:
 by a network node associated with the destination cell:
  receiving a moving user resource requirement and a predicted handover time for the moving user equipment;
  estimating a total resource requirement comprising a sum of the moving user resource requirement and an initial resource requirement comprising a sum of resource requirements of other user equipments in the destination cell;
  determining whether a capacity of the destination cell is sufficient to provide for the total resource requirement, and, if not, determining a decrement factor for each user equipment in the destination cell by:
   determining a required resource reduction using a difference between the capacity and the total resource requirement;
   determining a reduction factor for each user equipment in the destination cell by allocating a portion of the required resource reduction to each user equipment;
   determining a number of rescheduling events that will occur before the handover time; and
   calculating the decrement factor for each existing user equipment by dividing the reduction factor by the number of rescheduling events; and
  at each rescheduling event, decrementing the resources available to each user equipment by the respective decrement factor; and
 on handover, providing the moving user equipment with an allocated radio resource equal to at least part of the moving user resource requirement.
2. The method according to claim 1, wherein the initial resource requirement comprises a total requirement for user equipments predicted to be in the destination cell at the handover time.
3. The method according to claim 1, further comprising repeating, upon entry to or exit from the destination cell of a new user equipment or a change in a resource requirement of an existing user equipment, the step of determining of the decrement factor, to allow for changes in resource requirements caused by the entry or exit or the change in resource requirement.
4. The method as claimed in claim 1, further comprising the steps of;
 for each user equipment in the destination cell:
  determining whether the decrement factor is greater than a threshold for perceptible degradation;
 for each user equipment for which the decrement factor is greater than the threshold:
  calculating a difference between the decrement factor and the threshold; and reducing the decrement factor by a correction factor less than or equal to the difference; and calculating an allocation correction factor by summing the correction factors associated with each user equipment in the destination cell; and reducing the allocated radio resource by the allocation correction factor.

5. The method as claimed in claim 4, further comprising, prior to handover, the step of:

overprovisioning the moving user equipment in the originating cell with additional resources less than or equal to the allocation correction factor.

6. The method according to claim 1, wherein the step of predicting the handover time and destination cell comprises the steps of:

obtaining a plurality of signal strength measurements between the moving user equipment and a plurality of base stations and for each measurement, recording the signal strength and a time of measurement;

determining from the plurality of signal strength measurements a direction and magnitude of a maximum rate of change of signal strength; and using the magnitude and direction to predict a time and destination cell for handover.

7. The method according to claim 1, wherein the step of estimating the reduction factor comprises the steps of:

identifying a first resource allocation comprising an adjusted resource allocation for each user equipment in the destination cell, wherein the first resource allocation has a resource requirement which is less than or equal to the total resource requirement less the require resource reduction;

estimating an average utility value for all the user equipments in the cell for the first resource allocation; and either:

using the first resource allocation to determine the reduction factor for each user equipment; or identifying a second resource allocation, wherein the second resource allocation has a resource requirement which is less than or equal to the total resource requirement less the require resource reduction;

estimating an average utility for all the user equipments in the cell for the second resource allocation;

selecting one of the first and the second allocation, depending on which has the higher average utility; and using the selected allocation to determine the reduction factor for each user equipment.

8. The method according to claim 7, in which the utility value is estimated using a mean opinion score.

9. The method as claimed in claim 1, wherein the resource requirements are based on a Quality of Experience of a user.

10. An apparatus for use in a network node in a cellular network, the apparatus comprising: processor circuitry; a storage unit storing instructions executable by said processor circuitry, a transmitter and a receiver, whereby the apparatus is operative to:

receive, prior to handover of a moving user equipment to a cell associated with the network node, a moving user resource requirement and a predicted handover time for the moving user equipment;

estimate a total resource requirement comprising a sum of the moving user resource requirement and an initial resource requirement comprising a sum of resource requirements of other user equipments in the destination cell;

determine whether a capacity of the destination cell is sufficient to provide for the total resource requirement, and, if not, determine a decrement factor for each user equipment in the destination cell by:

determining a required resource reduction using a difference between the capacity and the total resource requirement;

determining a reduction factor for each user equipment in the destination cell by allocating a portion of the required resource reduction to each user equipment;

determining a number of rescheduling events that will occur before the handover time; and calculating the decrement factor for each existing user equipment by dividing the reduction factor by the number of rescheduling events; and at each rescheduling event, decrementing the resources available to each user equipment by the respective decrement factor; and on handover, providing the moving user equipment with an allocated radio resource equal to at least part of the moving user resource requirement.

11. The apparatus as claimed in claim 10, operative to estimate an initial resource requirement comprising a total requirement for user equipments predicted to be in the destination cell at the handover time.

12. The apparatus as claimed in claim 10, further operative to repeat, upon entry to or exit from the destination cell of a new user equipment or a change in a resource requirement of an existing user equipment, the determining of the decrement factor, to allow for changes in resource requirements caused by the entry or exit or the change in resource requirement.

13. The apparatus as claimed in claim 10, further configured to determine for each user equipment in the destination cell whether the decrement factor is greater than a threshold for perceivable degradation; and for each existing user equipment for which the decrement factor is greater than the threshold:

calculate a difference between the decrement factor and the threshold; and reduce the decrement factor by a correction factor less than or equal to the difference; and calculate an allocation correction factor by summing the correction factors associated with each user equipment in the destination cell; and reduce the allocated radio resource by the allocation correction factor.

14. The apparatus as claimed in claim 10, further configured to provide the allocation correction factor to a network node associated with an originating cell of the moving user equipment.

15. The apparatus as claimed in claim 10, wherein the resource requirements are based on a Quality of Experience of a user.

16. An apparatus for use in a network node in a cellular network, the apparatus comprising: processor circuitry; a storage unit storing instructions executable by said processor circuitry, a transmitter and a receiver, whereby the apparatus is operative to:

receive from a second network node associated with a destination cell, an allocation correction factor for a moving user equipment; and overprovision the moving user equipment with additional resources less than or equal to the allocation correction factor.

17. A computer program product comprising a non-transitory computer readable medium storing instructions which, when executed on at least one processor, cause the at least one processor to perform:

prior to a handover of a moving user equipment from an originating cell to a destination cell:

by a network node associated with the destination cell:

receiving a moving user resource requirement and a predicted handover time for the moving user equipment;

estimating a total resource requirement comprising a sum of the moving user resource requirement and an initial resource requirement comprising a sum of resource requirements of other user equipments in the destination cell;

determining whether a capacity of the destination cell is sufficient to provide for the total resource requirement, and, if not, determining a decrement factor for each user equipment in the destination cell by:

determining a required resource reduction using a difference between the capacity and the total resource requirement;

determining a reduction factor for each user equipment in the destination cell by allocating a portion of the required resource reduction to each user equipment;

determining a number of rescheduling events that will occur before the handover time; and calculating the decrement factor for each existing user equipment by dividing the reduction factor by the number of rescheduling events; and at each rescheduling event, decrementing the resources available to each user equipment by the respective decrement factor; and on handover, providing the moving user equipment with an allocated radio resource equal to at least part of the moving user resource requirement.

* * * * *